Jan. 12, 1971 F. F. HUNDLEY 3,553,753
TAP CHUCK WITH OVERLOAD RELEASE
Filed March 7, 1968

Floyd F. Hundley
INVENTOR.

BY *Lawrence A. O'Brien*
and *Harvey B. Jacobson*
Attorneys

United States Patent Office 3,553,753
Patented Jan. 12, 1971

3,553,753
TAP CHUCK WITH OVERLOAD RELEASE
Floyd F. Hundley, Oswego, Ill.
(P.O. Box 503, 500 N. Randall Road, Aurora, Ill. 60507)
Filed Mar. 7, 1968, Ser. No. 711,260
Int. Cl. B23b *31/00;* B23g *5/00*
U.S. Cl. 10—129       13 Claims

ABSTRACT OF THE DISCLOSURE

A body adapted to be held and supported at one end by a rotary drive member for rotation of the body about an axis concentric with the axis of rotation of the rotary drive member, the other end of the body having a blind cylindrical endwise outwardly opening counterbore formed therein terminating at its inner end in a noncircular bore concentric with the center axis of the counterbore. The counterbore and bore of the body are adapted to receive the cylindrical shank portion and noncircular terminal end, respectively, of a conventional tap and the counterbore loosely receives the shank portion of the tap and includes axially spaced radially inwardly projecting sealing and centering resilient rings engageable with the shank portion of an associated tap. Further, the body includes a vent passage communicating the exterior of the body with the bore and counterbore inwardly of the innermost sealing and centering ring means and the inner end of the bore has a resilient body seated therein for engagement by the terminal end of an associated tap, the vent means including one-way check valve means for preventing the movement of air therethrough into said bore and counterbore.

---

The tap chuck of the instant invention has been designed to provide a means whereby a tap may be supported for thread cutting operations in a manner enabling automatic compensation for slight machine feed misalignment and depth penetration. The tap chuck includes shear means whereby excessive forces may not be brought to bear upon the associated tap and means whereby the associated tap may be automatically secured in the chuck by vacuum upon insertion of the tap shank into the chuck and the tap, during operation, will be allowed to pull slightly forward in the chuck so as to allow tap lead withdrawal error of man or machine.

The main object of this invention is to provide a tap chuck which may be utilized to operatively support a tap in a manner such that slight machine misalignment will be automatically compensated for.

Another object of this invention is to provide a tap chuck including means by which the associated tap may be readily secured thereto against removal by vacuum automatically upon the associated tap being inserted into the chuck.

A further important object of this invention is to provide a tap chuck including means yieldingly limiting full penetration of the tap into the chuck and enabling the tap to pull slightly forward in the chuck to allow tap lead withdrawal error.

Still another object of this invention is to provide a tap chuck including shear means for limiting the rotational and axial thrusts which may be transmitted from the associated rotary drive member through the tap chuck to the associated tap.

A final object of this invention to be specifically enumerated herein is to provide a tap chuck in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
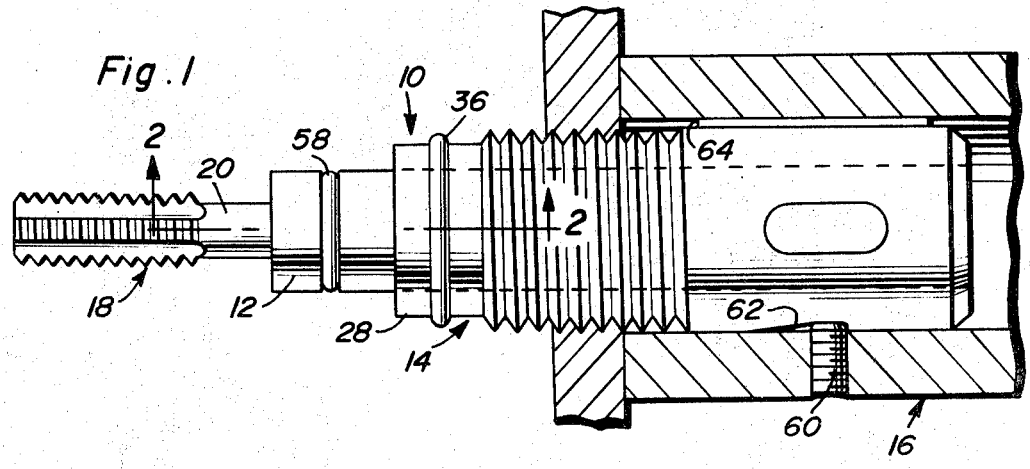
FIG. 1 is a side elevational view of the tap chuck of the instant invention operatively supporting a tap from a rotary drive member.

Referring now more specifically to the drawings, the numeral 10 generally designates the tap chuck of the instant invention. The chuck 10 includes a generally cylindrical inner body 12 and a generally sleeve-like outer body referred to in general by the reference numeral 14. The outer body 14 is removably supported from a rotary drive member referred to in general by the reference numeral 16 and a conventional tap referred to in general by the reference numeral 18 is illustrated supported from the inner body 12 in FIGS. 1–3 of the drawings.

The tap 18 includes a cylindrical shank portion 20 terminating at its end remote from the work-engaging end of the tap 18 in a reduced dimensioned terminal end portion 22 which is generally square in cross-sectional shape and centered relative to the longitudinal axis of the shank portion 20.

The body 12 includes a first cylindrical end 24 provided with a diametric bore 26 and snugly received in a first end 28 of the rotary drive member 16. The first end 28 of the rotary drive member 16 includes aligned radial bores 30 with which the diametric bore 26 is registered and a shear pin 32 is passed through the bores 30 and the bore 26 for keying the inner body 12 to the outer body 14 against rotation relative thereto and axial displacement relative thereto.

The outer body 14 includes a circumferentially extending and outwardly opening groove 34 into which the remote ends of the radial bores 30 open. A ring 36 constructed of resilient material is seated in the groove 34 and maintains the shear pin 32 in position against axial displacement relative to the bores 26 and 30.

The inner body 12 includes a second end 40 in which a blind counterbore 42 is formed. The counterbore 42 terminates inwardly in a reduced diameter bore 44 with a conical seat 46 being defined between the inner end of the counterbore 42 and the outer end of the bore 44. The bore 44 is of greater axial extent than the terminal end portion 22 and a resilient body 48 is seated in the bore 44 for engagement by the terminal end portion 22.

Figure 2:
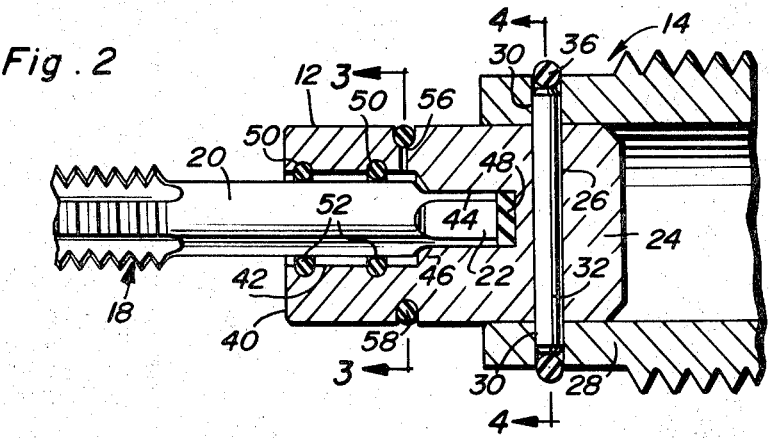
FIG. 2 is an enlarged fragmentary sectional view taken substantially upon the plane indicated by the section line 2—2 of FIG. 1.
Figure 3:
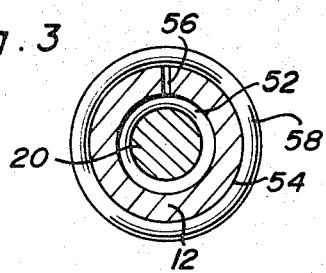
FIG. 3 is a transverse sectional view taken substantially upon the plane indicated by the section line 3—3 of FIG. 2.
Figure 5:
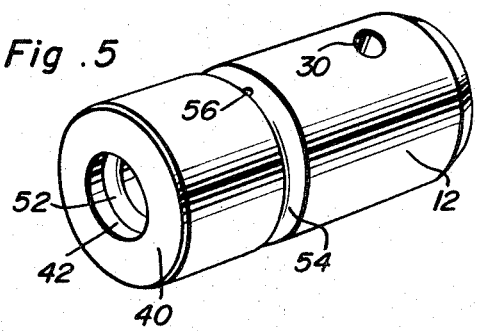
FIG. 5 is a perspective view of the body portion of the tap chuck.
Figure 4:
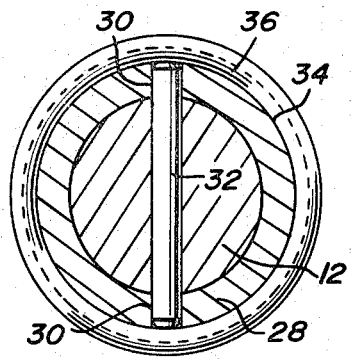
FIG. 4 is a transverse sectional view taken substantially upon the plane indicated by the section line 4—4 of FIG. 2.

From FIG. 2 of the drawings it may be seen that the terminal end portion 22 is reasonably snugly received within the bore 44. Of course, it is to be noted that the terminal end portion is substantially square in cross-sectional area and that the bore 44 is of a similar configuration. The shank portion 20, however, is somewhat loosely received in the counterbore 42 and the latter includes a pair of circumferential inwardly opening grooves 50 in which a pair of guide and centering sealing rings 52 are seated. The rings 52 form fluid-tight seals between the shank portion 20 and the inner surfaces of the counterbore 42 and also serve to yieldingly urge the shank portion 20 toward a centered position in the counterbore 42.

The inner body 12 further includes a circumferential groove 54 opening outwardly thereof centrally intermediate its opposite ends and a passage 56 is formed in the inner body 12 and communicates the inner extremity of the groove 54 with the inner end of the counterbore 42. A resilient O-ring 58 is seated in the groove 54 and coacts with the groove 45 and the outer end of the passage 56 to form a one-way check valve for the passage 56 to prevent the entrance of air into the bore 42 through the passage 56.

The outer body 14 is removably secured within the rotary drive member 16 by means of a setscrew 60 carried by the rotary drive member 16 and bearing against flattened portion 62 of the outer surface of the outer body 14. Also, the outer body 14 may be keyed to the rotary drive member 16 as at 64.

In operation, the conventional tap 18 may be inserted into the counterbore 42 and bore 44 merely by endwise advancing the terminal end portion 22 into the bore 44. As the terminal end portion 22 enters the bore 44, a majority of the air therein will be displaced outwardly therefrom through the passage 56 and the check valve means defined by the groove 54 and the resilient ring 58. Thus, axial withdrawal of the tap 18 from the bore 44 and the counterbore 42 is resisted by the resultant formation of a partial vacuum within the inner end of the bore 44 as axial withdrawal of the tap 18 is attempted. Further, full depth penetration of the terminal end portion 22 in the bore 44 is resisted by the compressible resilient member 48 and the rings 52 serve to allow slight angular displacement of the shank portion 20 relative to the counterbore 42 but also function to yieldingly urge the shank portion 20 toward a position concentric with the bore 44.

If the rotary drive member 16 exerts either too great axial forces on the tap 18 or excessive rotary forces on the tap 18, the pin 32 will shear and the tap 18 will be saved from damage. The cushion member 48 allows for tap lead error of the machine feeding the rotary drive member 16 in case the drive member 16 is overfed while tapping. In addition, the utilization of vacuum to yieldingly retain the tap 18 in the inner body 12 allows the tap to pull forward in the chuck slightly to allow for tap lead withdrawal error. Also, should the rotary drive member 16 be fed too quickly toward the right as viewed in FIG. 1 of the drawings while the tap 18 is engaged with a workpiece, the tap 18 will pull out of the inner body 12.

Of course, it may be appreciated that the tap 18 may be readily removed and engaged with the inner body 12. The improved structural features of the chuck 10 improve the quality of the threads cut by the tap 18 by holding tolerances uniformly and thus compensating for thread lead. In addition, tap breakage is substantially eliminated when using the shear pin and cushion member.

In addition to the above advantages, the utilization of vacuum to retain the tap 18 in the inner body 12 eliminates the past problem of tap tooth damage which was caused by the old method of knocking out the tap 18 with a hammer and drift pin and machinists using the tap chuck 10 will of course not even be subjected to conditions wherein their hands or fingers might be damaged by the required use of a hammer and drift pin to remove a tap. Also, if a tap being used is dull, the additional thrust to drive a dull tap will cause the shear pin 32 to shear whereby the dull tap is saved and may be readily re-sharpened.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed:

I claim:

1. A tap chuck comprising a body having one end adapted to be engaged and driven by a rotary drive member, the other end of said body having an endwise outwardly opening blind bore formed therein terminating at its inner end in an inner end section non-circular in cross-sectional shape, a tap including a work-engaging end portion at one end and a support shank at its other end terminating at its free end in a terminal end portion longitudinally shiftable through said bore and snugly receivable in said inner end section against rotation relative to said body with said shank snugly disposed in said bore, said body, outwardly of said inner end section, including seal means operative to form a fluid seal with said shank said body including a vent passage opening into the interior of said bore inwardly of said seal means and means defining a one-way check valve for said vent passage preventing the inward passage of ambient air into the interior of said body, whereby insertion of said terminal end portion into said inner end section and said shank into said bore will tend to drive at least a substantial portion of the air from said bore and movement of said tap outwardly of said bore be resisted by the resultant reduction of air pressure within said bore inwardly of said seal means.

2. The combination of claim 1 wherein said seal means includes a ring seal carried by said body projecting slightly radially inwardly of the walls of said bore and disposed in reasonably good fluid-tight sealed engagement with said body and said shank.

3. The combination of claim 1 wherein said body includes a circumferentially extending groove formed in its outer surface, said means defining a one-way check valve comprising a resilient ring seal seatingly disposed in said groove, and passage means communicated at one end with said bore inwardly of said seal means and at the other end with an inner portion of said groove, whereby said ring seal, groove and passage means define a one-way check valve against the admittance of ambient atmosphere into said bore through said passage means.

4. The combination of claim 1 including a resilient compressible abutment disposed in the inner end of said inner end section engageable by said terminal end portion, the axial extent of said terminal end portion being less than the axial extent of said inner end section.

5. The combination of claim 1 including a rotary drive member defining a bore opening outwardly of one axial end thereof and concentric with the axis of rotation of said drive member, said one end of said body being rotatably and slidably received in said one axial end in predetermined position with at least said tap projecting outwardly of said one axial end, and shearable drive means locking said body in said drive member for rotation therewith and against axial displacement from said predetermined position in said last-mentioned bore, said body being free of portions thereof engageable with said rotary drive member to prevent axial shifting of said body relative to said bore upon the shearing of said drive means whereby said body and said tap remain stationary during continued rotation and axial advancement of said rotary drive member.

6. The combination of claim 5 wherein said shearable drive means includes a shear pin removably secured through said body along a diameter of said axis and including opposite end portions snugly received through adjacent portions of said rotary drive member.

7. The combination of claim 6 wherein said rotary drive member includes a sleeve-like end in which said last-mentioned bore is formed, said adjacent portions of said rotary drive members defining aligned bores extending radially of said axis and in which the opposite end portions of said shear pin are snugly received.

8. The combination of claim 7 wherein said sleeve-like end includes a circumferentially extending outwardly opening groove into which the remote outer ends of said radial bores open, and a resilient and expandable ring seated in said groove removably retaining said shear pin in said aligned bores against axial withdrawal therefrom.

9. A tap chuck comprising a body having one end adapted to be engaged and driven by a rotary drive member, the other end of said body having an endwise outwardly projecting tap supported therefrom a rotary drive member defining a bore opening outwardly of one axial end thereof and concentric with the axis of rotation of said drive member, said one end of said body being rotatably and slidably received in said one axial end in predetermined position with at least said tap projecting outwardly of said one axial end, shearable drive means locking said body in said drive member for rotation therewith and against axial displacement from said predetermined position in said last-mentioned bore, said body being free of portions thereof engageable with said rotary drive member to prevent axial shifting of said body relative to said bore upon shearing of said drive means whereby said body and said tap remain stationary during continued rotation and axial advancement of said rotary drive member.

10. The combination of claim 9 wherein said rotary drive member includes a sleeve-like end in which said last-mentioned bore is formed, said adjacent portions of said rotary drive members defining aligned bores extending radially of said axis and in which the opposite end portions of said shear pin are snugly received.

11. The combination of claim 10 wherein said sleeve-like end includes a circumferentially extending outwardly opening groove into which the remote outer ends of said radial bores open, and a resilient and expandable ring seated in said groove removably retaining said shear pin in said aligned bores against axial withdrawal therefrom.

12. The combination of claim 9 wherein said shearable drive means includes a shear pin removably secured through said body along a diameter of said axis and including opposite end portions snugly received through adjacent portions of said rotary drive member.

13. The combination of claim 9 wherein said other end of said body has an endwise outwardly opening counterbore formed therein terminating at its inner end in a bore non-circular in cross-sectional shape, said tap including a work-engaging end portion at one end and a support shank at its other end terminating at its free end in a terminal end portion longitudinally shiftable through said counterbore and snugly receivable in said bore against rotation relative to said body with said shank snugly disposed in said counterbore, said body outwardly of the inner end of said counterbore including seal means operative to form a fluid-tight seal with said shank, said body including a vent passage opening into the interior of said counterbore inwardly of said seal means and means defining one-way check valve for said vent passage providing the inward passage of ambient air into the interior of said body, whereby insertion of said terminal end portion into said bore and said shank into said counterbore will tend to drive at least a substantial portion of the air from said bore and counterbore and movement of said tap outwardly of said bore and counterbore will be resisted by the resultant reduction of air pressure within said bore and counterbore inwardly of said seal means.

References Cited

UNITED STATES PATENTS

| 2,484,027 | 10/1949 | Haffey | 279—102 |
| 2,550,635 | 4/1951 | Brown et al. | 279—16 |
| 2,854,238 | 9/1958 | Kennell | 279—1 |
| 3,448,988 | 6/1969 | Athanasiou | 279—1 |

FOREIGN PATENTS

| 15,627 | 7/1956 | Germany | 279—102 |
| 140,615 | 4/1920 | Great Britain | 10—141 |
| 731,887 | 6/1955 | Great Britain | 279—1 |

CHARLES W. LANHAM, Primary Examiner

E. M. COMBS, Assistant Examiner

U.S. Cl. X.R.

10—141; 279—16